United States Patent [19]

Shultz et al.

[11] Patent Number: 5,666,195
[45] Date of Patent: Sep. 9, 1997

[54] EFFICIENT FIBER COUPLING OF LIGHT TO INTERFEROMETRIC INSTRUMENTATION

[75] Inventors: Theodore S. Shultz, Larchmont; George J. Lind, Dobbs Ferry, both of N.Y.

[73] Assignee: Electro-Optical Sciences, Inc., Irvington, N.Y.

[21] Appl. No.: 434,580

[22] Filed: May 1, 1995

[51] Int. Cl.$^6$ ..................... G01B 9/02
[52] U.S. Cl. ..................... 356/352
[58] Field of Search ..................... 356/352, 345

[56] References Cited

U.S. PATENT DOCUMENTS

| 4,850,709 | 7/1989 | Ban et al. | 356/352 |
|---|---|---|---|
| 4,945,531 | 7/1990 | Suzuki | 356/352 |
| 5,039,201 | 8/1991 | Liu | 356/352 |

FOREIGN PATENT DOCUMENTS

| 2145237 | 3/1985 | United Kingdom | 356/352 |
|---|---|---|---|
| 2215038 | 9/1989 | United Kingdom | 356/352 |

OTHER PUBLICATIONS

Max Born and Emil Wolf, *Principles of Optics*, Sixth Edition, 1980, pp. 323–333, 350–358.

Benedikt Faust and Lennart Klynning, "Low–cost wavemeter with a solid Fizeau interferometer and fiber–optic input," *Applied Optics*, vol. 30, No. 36, 20 Dec. 1991, pp. 5254–59.

W. Moos, G.F. Imbusch, L.F. Mollenauer and A.L. Schalow, "Tilted–Plate Interferometery with Large Plate Separations," *Applied Optics*, vol. 2, No. 8, Aug. 1963, pp. 817–822.

D.F. Gray, K.A. Smith and F.B. Dunning, "Simple compact Fizeau wavemeter," *Applied Optics*, vol. 25, No. 8, 15 Apr. 1986, pp. 1339–1343.

Mark B. Morris, Thomas J. McIlrath and James J. Snyder, "Fizeau wavemeter for pulsed laser wavelength measurement," *Applied Optics*, vol. 23, No. 21, 1 Nov. 1984, pp. 3862–3868.

Leo J. Cotnoir, "Stand–alone instruments measure laser wavelengths," *Laser Focus World*, Apr. 1989, pp. 109–120.

Christopher Reiser, Peter Esherick and Robert B. Lopert, "Laser–linewidth measurement with a Fizeau wavemeter," *Optics Letters*, vol. 13, No. 11, Nov. 1988, pp. 981–983.

H.D. Polster, "II. Miltiple Beam Interferometry," *Applied Optics*, vol. 8, No. 3, Mar. 1989, pp. 522–525.

"Pulsed Wavemeter—Wavelength Measurement With More Certainty, Less Stress," Models WA–5500, WA–4500, Burleigh Instruments, Inc., Burleigh Park, Fisher, NY 14453, Jun. 1994.

C. Cahen et al., "Wavelength stabilization and control of the emission of pulsed dye lasers by means of a multibeam Fizeau interferometer," *Revue Phys. Appl.*, 16 (1981) pp. 353–358.

*Primary Examiner*—Frank G. Font
*Assistant Examiner*—Amanda Merlino
*Attorney, Agent, or Firm*—Brooks Haidt Haffner & Delahunty

[57] ABSTRACT

The invention consists of a method of redirecting light to improve the transmission efficiency of wedged multibeam interferometers, either individually or in cascade with other interferometers. Optical fibers are placed to direct reflected light into such positions which enable iterated transmission of this otherwise wasted light through the interferometer. The increased light coupling efficiency provided by the method makes it well suited for applications to fiber optic communication links, fiber optic Bragg sensors, ladars and lidars.

24 Claims, 5 Drawing Sheets

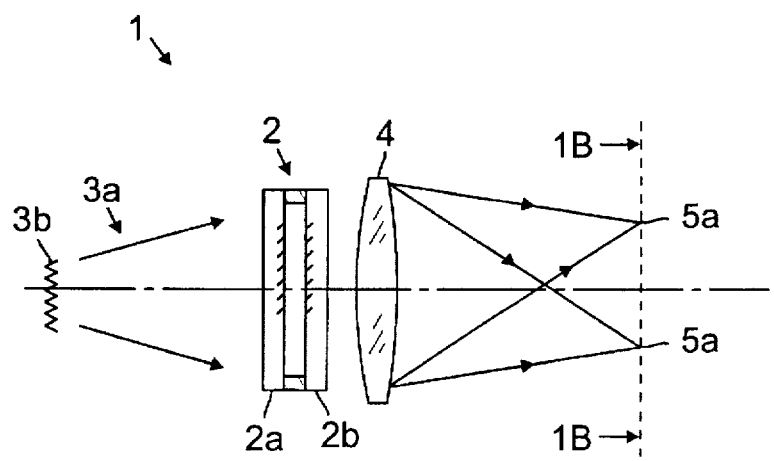
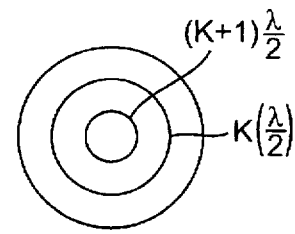
FIG. 1A
PRIOR ART
FIG. 1A
PRIOR ART
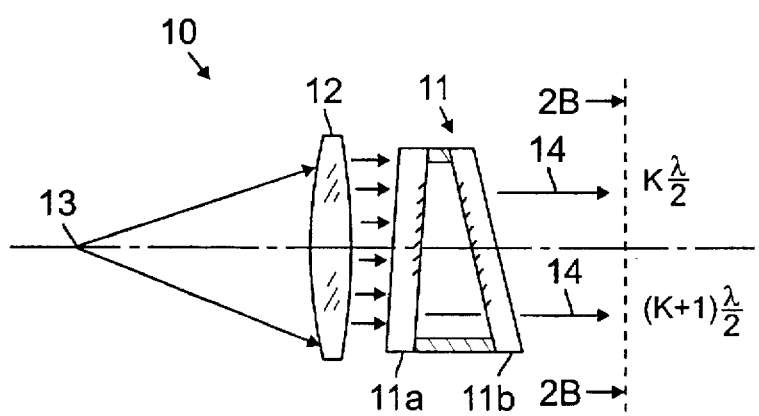
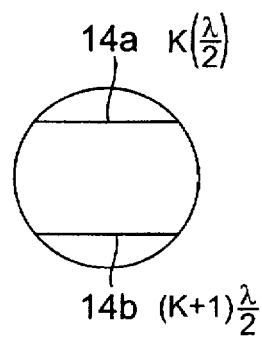
FIG. 2A
PRIOR ART
FIG. 2B
PRIOR ART

EFFICIENT FIBER COUPLING OF LIGHT TO INTERFEROMETRIC INSTRUMENTATION

FIELD OF THE INVENTION

This invention relates to interferometers and methods and apparatus for improving the efficiency and utility of interferometers included in fiber optics links, fiber optics Bragg sensors, ladars, and lidars. More particularly, the invention allows better utilization of radiation incident to an interferometer, and provides an efficient means of coupling two or more interferometers.

BACKGROUND OF THE INVENTION

Interferometers known as multiple beam interferometers are low transmissivity devices which make use of what is called multiple beam interference, which is described in detail in Max Born and Emil Wolf, *Principles of Optics*, Sixth Edition, 1980, Pergamon Press, Inc., Elmsford, N.Y. 10563, pp. 323–33, 350–58, incorporated by reference herein. These interferometers are used, for example, as wave-meters to measure the wavelength of incident radiation; as filters to transmit only desired portions of the incident radiation; and as discriminators to respond to changes in the incident radiation. See Benedikt Faust and Lennart Klynning, "Low-cost wavemeter with a solid Fizeau interferometer and fiber-optic input," *Applied Optics*, Vol. 30, No. 36, 20 Dec. 1991, pp. 5254–59; W. Moos, G. F. Imbusch, L. F. Mollenauer and A. L. Schalow, "Tilted-Plate Interferometry with Large Plate Separations," *Applied Optics*, Vol. 2, No. 8, August 1963, pp. 817–22; D. F. Gray, K. A. Smith and F. B. Dunning, "Simple compact Fizeau wavemeter," *Applied Optics*, Vol. 25, No. 8, 15 Apr. 1986, pp. 1339–43; Mark B. Morris, Thomas J. McIlrath and James J. Snyder, "Fizeau wavemeter for pulsed laser wavelength measurement," *Applied Optics*, Vol. 23, No. 21, 1 Nov. 1984, pp. 3862–68; Leo J. Cotnoir, "Stand-alone instruments measure laser wavelengths," *Laser Focus World*, April 1989, pp. 109–20; Christopher Reiser, Peter Esherick and Robert B. Lopert, "Laser-linewidth measurement with a Fizeau wavemeter," *Optics Letters*, Vol. 13, No. 11, November 1988, pp. 981–83; H. D. Polster, "II. Multiple Beam Interferometry," *Applied Optics*, Vol. 8, No. 3, March 1989, pp. 522–25, all of which are incorporated by reference herein. In addition, these interferometers have been used as spectrum analyzers, wavelength-division multiplexers, and in other related applications.

The measurement of the wavelength of optical radiation with a precision of better than 1 part in $10^6$ generally requires the use of interferometric instrumentation. For this purpose, there are two generic types of interferometric instruments, scanning and fixed. Scanning instruments are not considered here, because they are only well suited for use with continuous wave (CW) sources. Fixed interferometers can be used with either pulsed or CW light sources, and are useful for a wide variety of applications.

A multiple beam interferometer is termed an etalon when the spacing between its plates or mirrors is "fixed" or not adjustable. Multi-beam etalons are generally categorized as either Fabry-Perot etalons, which include mirrors that are parallel-spaced, as in FIG. 1A, or Fizeau etalons, which include mirrors that are wedged-spaced as in FIG. 2A.

FIG. 1A illustrates a multibeam interferometer 1 including a parallel etalon 2 which is illuminated with divergent light 3a originating from a source 3b. The etalon 2 forms circularly symmetric fringes at infinity by multiple beam interference. These fringes possess intensity maxima at angles θ such that t cos θ is an integer number of half-wavelengths λ/2, where θ is the angle of incidence at the etalon 2 with respect to the optical axis and t is the optical path length between mirrors 2a and 2b of the etalon 3. Focusing optics 4 image the fringes received from the etalon 2 onto a focal plane 5 as fringes 5a, as shown in FIG. 1B, at integer numbers of half wavelengths λ/2, where K and K+1 represent two successive integers. Light which is not transmitted through the parallel etalon 2 of the interferometer 1 diverges upon reflection and is not available for further use.

FIG. 2A illustrates an interferometer 10 including a wedged-spaced etalon 11 which is illuminated with collimated or parallel light supplied from a collimating optic or lens 12 which receives light from a source 13. Straight fringes 14 are formed by the etalon 11 and have intensity maxima occurring where the effective optical path between mirrors 11a and 11b of the etalon 11 is an integer number of half-wavelengths. FIG. 2B illustrates two such fringes 14a and 14b, corresponding to successive integers K and K+1, as they may be observed in transmission at any plane beyond the etalon 11, without the need for additional optics. It is well known that optics may be used to modify the fringe spacing or to collapse the straight fringes into high-intensity spots.

In conventional applications of the configurations for the interferometers illustrated in FIGS. 1A and 2A, the light that is not transmitted through the interferometer is reflected back but not otherwise utilized. For the parallel-mirror etalon 2 of the interferometer 1, the incident light is divergent, so that the reflected light continues to diverge and cannot be further employed. However, the wedged etalon 11 of the interferometer 10 is illuminated with collimated light, so that the reflected light remains collimated but nevertheless also unutilized.

SUMMARY OF THE INVENTION

It is an object of this invention to provide a method of using both the light transmitted and reflected from an interferometer to increase interferometer efficiency.

It is a further object of this invention to provide a method for coupling a wedged-spaced etalon interferometer with one or more other interferometers or other instruments or apparatus using optical fiber.

It is a further object of this invention to provide a method for illuminating a wedged-spaced interferometer with light supplied from multiple sources over several respective fibers such that light fringes generated from the multiple sources can be measured simultaneously.

It is a further object of this invention to provide a method of incorporating an optical fiber having optical gain in an interferometer so as to increase the optical signal level.

In accordance with the present invention, optical fiber coupling is applied to a wedged-spaced etalon interferometer to provide for use of both the transmitted and reflected light and, therefore, increase the efficiency of the interferometer. In preferred embodiments, fiber coupling is provided for redirecting the reflected light back through the interferometer, for coupling one or more interferometers to a first interferometer; for illuminating a wedged-spaced interferometer with several fibers such that wavelengths of light from multiple sources can be measured at the same time; and for incorporating into an optical fiber optical gain to further increase the efficiency of a wedged-spaced interferometer.

For a better understanding of the present invention, together with other and further objects, reference is made to the following description, taken in conjunction with the accompanying drawings.

BRIEF DESCRIPTION OF THE DRAWINGS

FIG. 1A is a simplified, two dimensional diagram illustrating a parallel Fabry-Perot etalon.

FIG. 1B is an illustration of the light imaged from the etalon in FIG. 1A as seen at a focal plane.

FIG. 2A is a simplified, two dimensional diagram illustrating a wedged interferometer.

FIG. 2B is an illustration of the light imaged from the etalon in FIG. 2A.

DETAILED DESCRIPTION

In accordance with the present invention, a wedged-spaced etalon interferometer provides for separation of light, which is directed to be incident upon a first mirror of a wedged etalon at a slight angle, from light reflected by the etalon and then provides for refocussing of the reflected light for further use, for example, by optical coupling. The wedged-spaced etalon produces narrow fringes of transmitted light having a high resolution. As described below in connection with FIGS. 5, 6 and 8, the reflected light may be directed towards a position or set of positions which constitute additional "primary" sources that may be used for illuminating the interferometer from a position different from the original source position.

Figure 3:
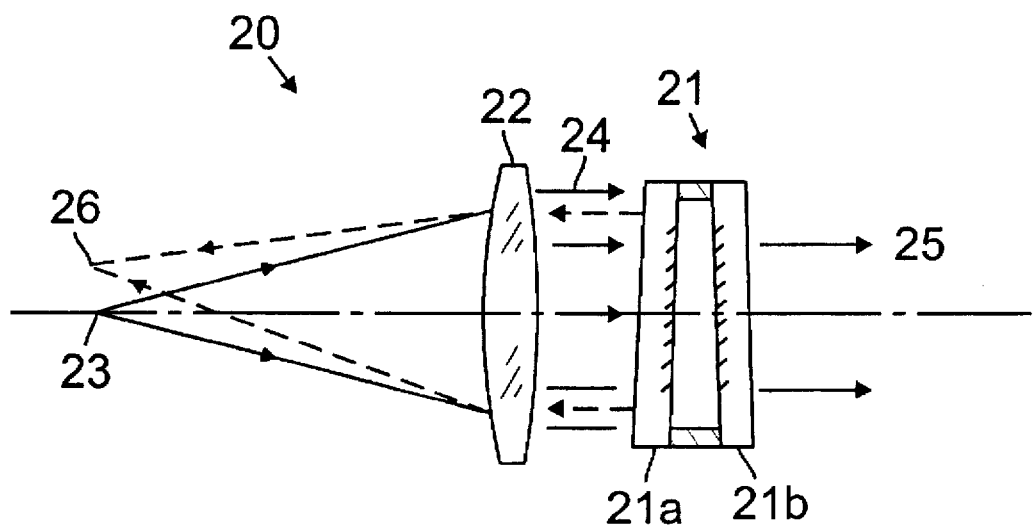
FIG. 3 is a simplified illustration of an interferometer apparatus for separating transmitted and reflected light, according to the invention.

FIG. 3 illustrates an exemplary embodiment of a wedged-spaced etalon interferometer 20 which operates in accordance with present inventive technique. Referring to FIG. 3, the interferometer 20 includes a wedged-spaced etalon 21 formed from mirrors 21a and 21b. The etalon 21 follows a collimating lens 22 in the optical signal path. The lens 22 is illuminated with light provided from a source 23. The lens 23 collimates the light from the source 23 to generate parallel light 24. The etalon 21 reflects substantially all of the light 24 at the mirror 21a. The reflected light passes back through the lens 22 and is focused at a spot 26 which is displaced from but in the same focal plane as the source 23. The structure of a wedged etalon, such as the etalon 21, provides that the narrowest light fringes having the highest resolution are formed by light which is incident on the first mirror 21a of the etalon 21 at a slight angle. This permits separation of the reflected light from the light incident upon the etalon 21.

In accordance with the present invention, the reflected light focused onto the spot 26 is collected and utilized without impacting any of the radiation initially directed to the interferometer 20 from the source 23. The amount of light transmitted through the etalon 21 is a function of the reflectivity of the mirror 21a and typically lies between 5% and 0.5%, for mirror reflectivities between 0.85 and 0.985. Consequently, 95% to 99.5% of the incident light is reflected and can be used for improving interferometer efficiency.

Figure 4:
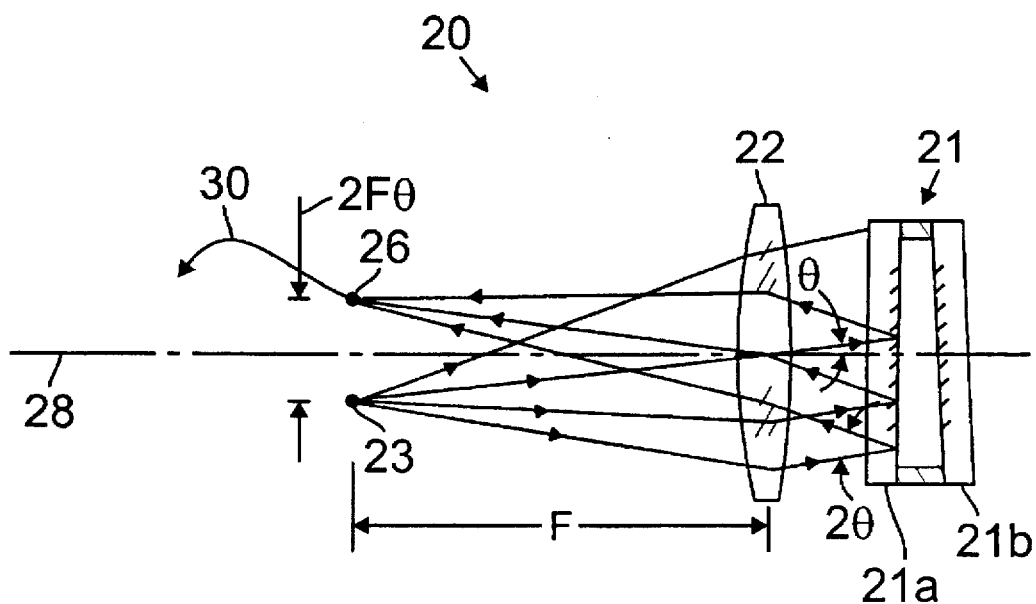
FIG. 4 is a simplified illustration of an interferometer apparatus for collecting reflected light according to the invention.

FIG. 4 illustrates the interferometer 20 of FIG. 3 including an optical fiber 30. Referring to FIG. 4, the source 23 is displaced from an optical axis 28 to cause the source beam to be incident upon the first reflecting surface of the interferometer 20, i.e., the mirror 21a, at an angle θ which is substantially equal to the angular displacement of the source 23 from the optical axis 28. The lens 22 also redirects light reflected from the mirror 21a of the etalon 21 to form a focused spot 26 which is in the same plane as the original source 23 but displaced from the source 23 at an angular displacement substantially equal to 2θ or twice the angle of incidence θ of the source beam onto the mirror 21a. The input end of the optical fiber 30 is preferably placed at the position of the focused reflected spot 26 to enable convenient redirection of the collected light.

Figure 5:
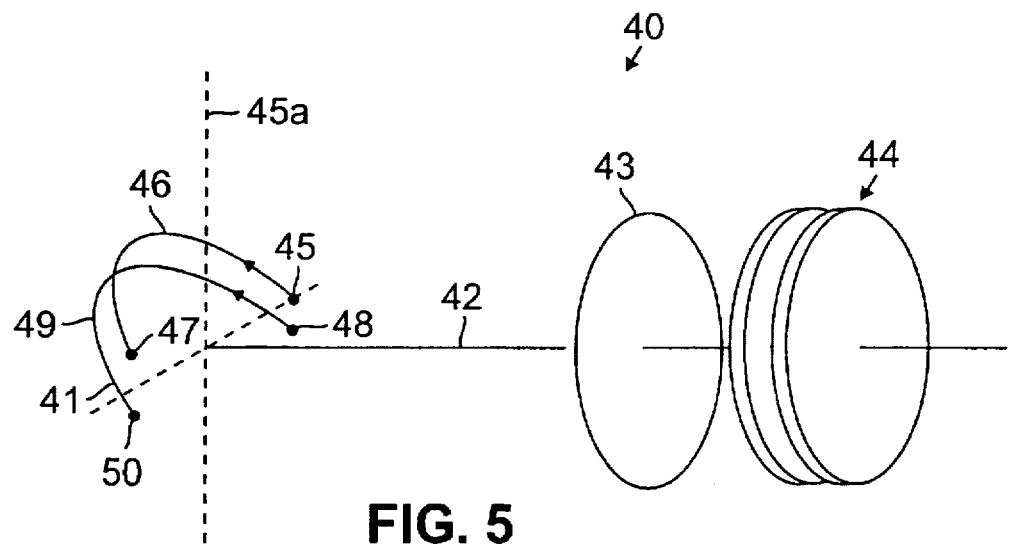
FIG. 5 is a perspective view of an interferometer apparatus which uses both transmitted and reflected light to increase interferometer efficiency.

FIG. 5 illustrates an exemplary embodiment of an interferometer 40 which utilizes both transmitted and reflected light to increase its efficiency. Referring to FIG. 5, light from a source 41, which is displaced from an optical axis 42, is directed to a lens 43. The lens 43 collimates the light incident from the source 41 for illuminating an etalon 44. The light reflected from the etalon 44 is focused at a spot 45 in the focal plane 45a of the lens 43. An optical fiber 46 collects the light at the spot 45 and routes it to a position 47 which is adjacent to the source 41. This routing enables the etalon 44 to be illuminated again in a second pass. With respect to the optical axis 42, the reflected light which is focussed at the spot 45 represents a secondary source that is positioned symmetric to the source 41, which represents a primary source. Subsequent secondary sources may be situated in a similar manner, i.e., they are located symmetric relative to the images formed based on light radiated from primary sources. For example, the secondary source at the spot 47 has a reflected image at spot 48 in the focal plane 45a and an optical fiber 49 can be used to route the light to a position 50 to allow for a third pass through the interferometer 40. This process can be repeated several times. Five or more passes are possible, taking into account practical limits on the accuracy of positioning fibers, including their cladding and mechanical mounting and the required proximity to the sources and their reflected images. The fibers 46 and 49 etc. can be either single-mode or multimode, depending on the specific application.

Figure 6:
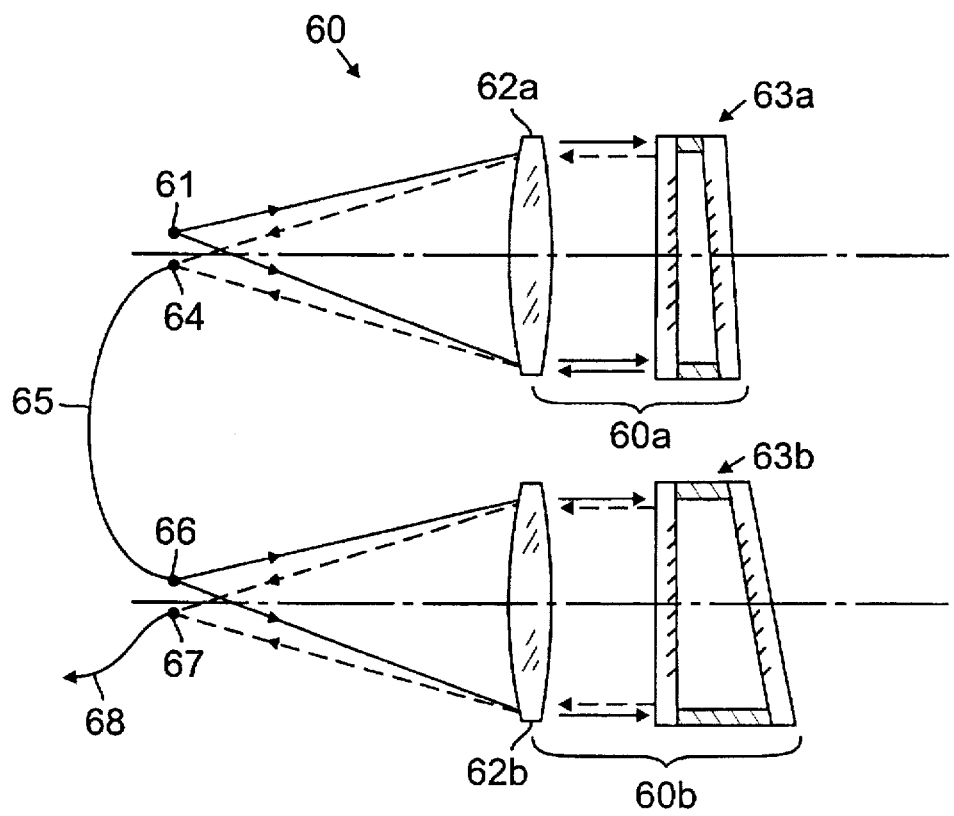
FIG. 6 is a simplified illustration of an interferometer apparatus which uses an optical fiber for coupling a wedged-spaced etalon interferometer with one or more other interferometers.

FIG. 6 illustrates an embodiment of an interferometer 60 which includes fiber coupling of a wedged-spaced etalon interferometer 60a with another wedged-spaced interferometer 60b. Referring to FIG. 6, a light source 61 illuminates a lens 62a and an etalon 63a in the same manner as described above. The source light is routed through the lens 62a, reflected by the etalon 63a and then focused by the lens 62a at a spot 64, which is symmetric to the source 61. An optical fiber 65 collects the reflected light which is focussed at the spot 64 and routes the light to a location 66. The location 66 represents a source that illuminates etalon 63b of the interferometer 60b through a lens 62b. The etalon 63b may have different characteristics than the etalon 63a. The light reflected from the etalon 63b is imaged at spot 67 in the focal plane of the lens 62b, where it is collected by optical fiber 68. The light routed though the fiber 68 can be used to re-illuminate either of the etalons 63a or 63b, in the manner described above for the interferometer 40 shown in FIG. 5, for increasing the efficiency of light use. The optical fiber 68 also can be used to route light to another apparatus, such as a light energy detector. Alternatively, one can use a combination of rerouting to another apparatus and re-illumination to increase the efficiency with which light is used. Several types and sizes of optical fiber can be used for these purposes.

Figure 9:
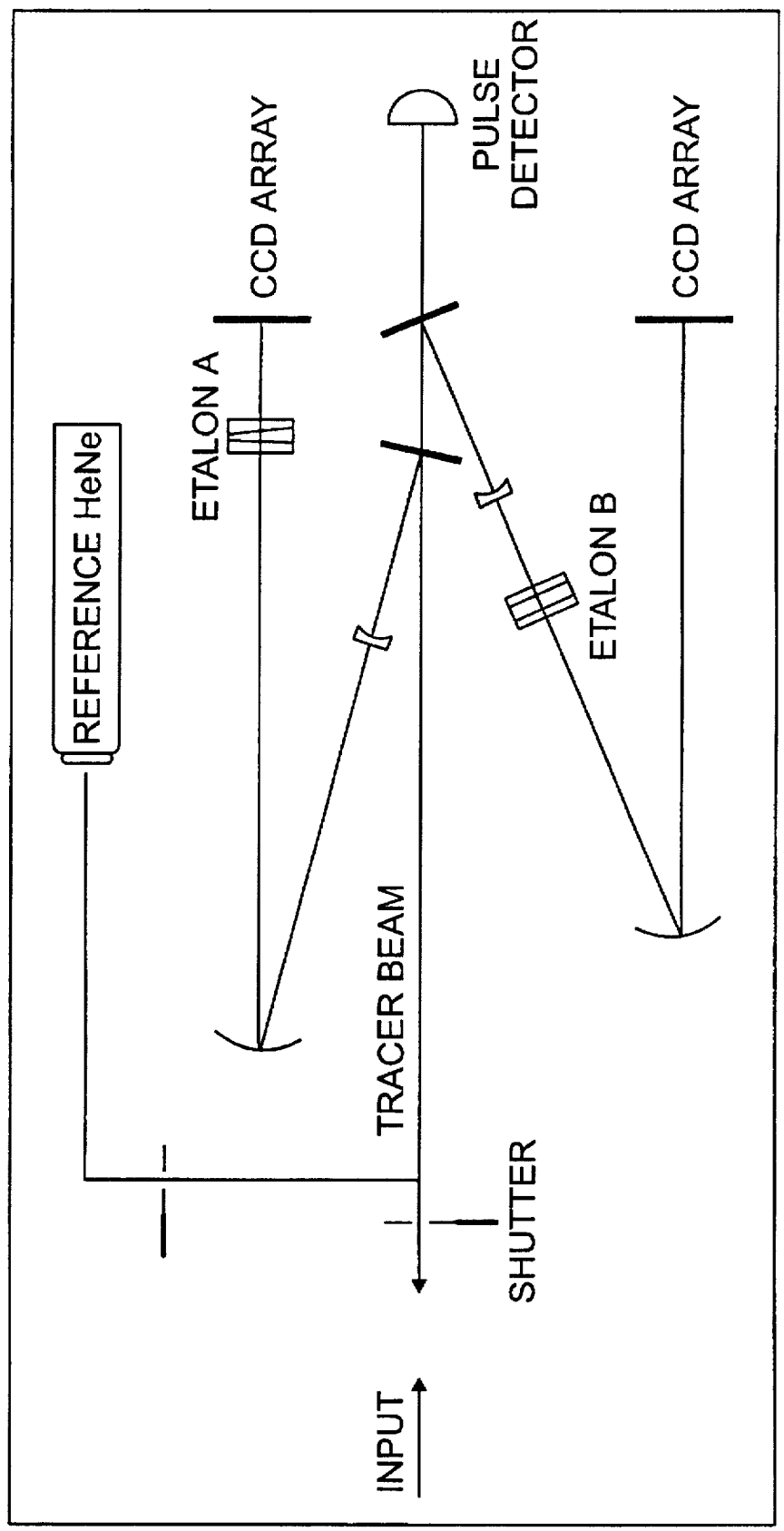
FIG. 9 is a simplified illustration of the present state of the art in coupling two interferometers.

In addition, coupling of several interferometers in accordance with the present invention as shown in FIG. 6 provides for higher precision of measurement of light wavelength or for a wider spectral coverage, with no loss in efficiency when pulsed or CW light sources are used. In one preferred embodiment, the interferometer 60 may include a first interferometer having a coarse precision and a large free spectral range (FSR), the spectral region over which a wavelength can be identified unambiguously, which is coupled to a second interferometer having a narrow FSR. This would improve the precision with which the wavelength of light can be determined, overcoming the well known problem implicit in the inverse relationship between FSR and wavelength measurement precision. In contrast, FIG. 9 illustrates the present state-of-the-art, as described in "Pulsed Wavemeter®—Wavelength Measurement With More Certainty, Less Stress," Models WA-5500, WA-4500, Burleigh Instruments, Inc., Burleigh Park, Fishers, N.Y. 14453, June 1994, incorporated by reference herein, for coupling two interferometers. The radiation to be measured is split up by beamsplitters for illuminating two etalons. As shown in FIG. 9, small-diameter parallel beams are divided and then modified by optical elements to increase the beam diameter or the beam divergence.

Figure 7:
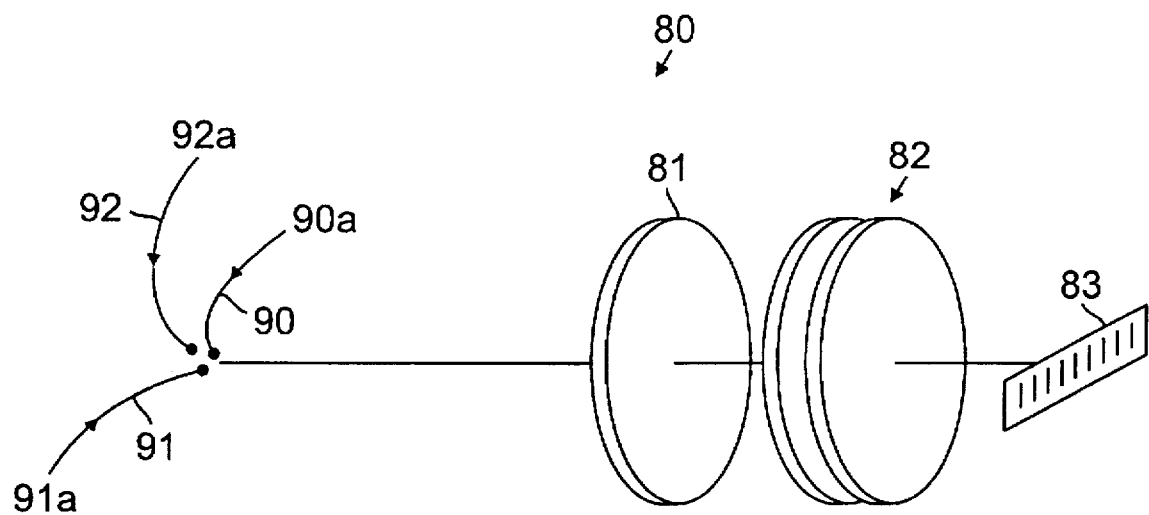
FIG. 7 is a perspective view of an interferometer apparatus which illuminates a wedged-spaced etalon using light provided over several optical fibers such that the wavelengths of light supplied by multiple sources can be measured.

FIG. 7 illustrates an embodiment of an interferometer 80 which uses several optical fibers for illuminating a wedged-spaced etalon 82 such that the wavelengths of multiple sources can be measured individually. Referring to FIG. 7, the interferometer 80 comprises a lens 81, the etalon 82 and a linear photodetector array 83 arranged in sequence in an optical signal path. Optical fibers 90, 91 and 92 are connected to sources 90A, 91A and 92A, respectively, for routing light from the sources 90A, 91A and 92A to the lens 81. The light directed from these sources to the interferometer 80 results in the production of a fringe pattern by the etalon 82. The fringe locations associated with each of the sources 90A, 91A and 92A can be determined by causing the fringe patterns to fall on the linear detector array 83 and then by reading out the array in a suitable time sequence. The detected output may be supplied to a computer equipped with a frame generator or an analog to digital converter for processing, as would be output of a conventional interferometer. The sources can be CW (continuous-wave), modulated light sequentially shuttered in a time sequence appropriate to the detector array, or pulsed light with appropriately coded interpulse spacing.

In one preferred embodiment, the interferometer 80 of FIG. 7 may be calibrated for determining the wavelength of an unknown source. One fiber would be coupled to a calibrating source of a known wavelength, while a second fiber would be coupled to the source whose wavelength is to be measured. By separately measuring the fringe pattern when both fibers are illuminated by the same source, the fringe displacement can be calibrated to account for fringe shifts that might be produced as a result of small differences in the locations of the optical fibers. The displacements associated with calibration of the fringe pattern could then be incorporated into software executable by a microcontroller to allow for determination of the wavelength of an unknown source based on the output of the detector array.

In another preferred embodiment, the interferometer 80 may be used for measuring the light reflected and scattered from a moving object for determining the relative velocity of the object in accordance with the Doppler effect. According to the Doppler effect, light reflected from a moving object undergoes a frequency shift, $\Delta f_D = 2v_l/\lambda$, where $v_l$ is the relative velocity component along the line of sight and $\lambda$ is the wavelength of the incident light. The relative velocity is represented by the difference in frequency (or wavelength) between the source and the returning radiation. One of the fibers in the interferometer 80 may be used to sample the source wavelength, and the other to receiver the Doppler-shifted radiation which is reflected. The source and reflected signals are separated in time, for the light must travel from source to target and back. In many practical cases, this time delay is sufficient for the source wavelength to be sampled in one fiber and read out by the linear detector array before the return signal that is fed to the second fiber is received. Doppler frequency shifts would be determined by analyzing differences in signal location along the detector array. It is noted that if the source wavelength were to vary significantly for pulsed light signals, it would be necessary to monitor the source wavelength (or frequency) on each pulse. A previously developed technique for accomplishing such monitoring employed the "edge filter" method. The sensitivity of this technique, however, is limited to measurement of changes in source frequency that are of the same order as the Doppler-induced shift, which is generally quite small. Much larger shifts can be accommodated by using a fiber-coupled interferometer having multiple fiber inputs. This can be implemented in a manner similar to FIG. 7, but with two input fibers. One of these fibers is used to sample the source wavelength, while the other accepts the Doppler-shifted return. These signals are separated in time, for the light must travel from source to target and back. In many practical cases, this time delay is sufficient for the source wavelength to be sampled in one fiber and read out by the linear detector array before arrival of the return signal that is fed to the second fiber. Thus, Doppler frequency shifts can be determined by analyzing differences in signal location along the detector array. It is further noted that if two input fibers are placed in juxtaposition, the difference in the fringe pattern associated with scattering from a stationary target can be held to a minimum, and any difference that does exist can be compensated using an initial calibration in the manner described above.

In still a further embodiment, the interferometer 80 may be utilized for simultaneously measuring changes in wavelength of light incident upon several wavelength-dependent sensors, such as Bragg sensors. One type of fiber optic sensor, known as the fiber Bragg grating, is used to measure temperature, pressure, strain, refractive index, etc. The Bragg grating utilizes periodic, structured index variations in the core. When the grating is illuminated with a broadband light source, specific wavelengths are reflected that are a function of the periodic grating structure. The remainder of the spectrum is transmitted through the fiber. As the periodic structure is changed by variations in temperature, pressure, strain, etc., characteristic changes occur in the reflection wavelengths. Fiber Bragg wavelength changes are used to monitor changes in such structures as bridges, buildings, dams, aircraft wings, etc. It is often necessary to monitor many locations on a particular structure. This can be accomplished by positioning several fiber Bragg sensors in series, connected by conventional, non-Bragg fibers, with each sensor designed to reflect a different wavelength. In current practice, the Bragg fiber is illuminated with a broadband source, and the return signal is scanned to measure the reflected wavelengths. The scanning time required currently seriously limits the achievable data rate. The present invention employs a fiber-coupled wedged interferometer in order to achieve simultaneous measurement of changes in several Bragg sensors at once. Not only can several Bragg sensors be placed in a series "string" but several such strings can be used, each string feeding one of multiple inputs as depicted in FIG. 7. Each of these strings can be addressed with a pulsed source, the pulses suitably spaced in time. Time sequencing is limited only by the readout rate of the detector array, which can be as fast as 20 MHz. With the improved configuration of this invention, the data rate can be made fast enough to permit strain sensors to indicate vibrations.

Figure 8:
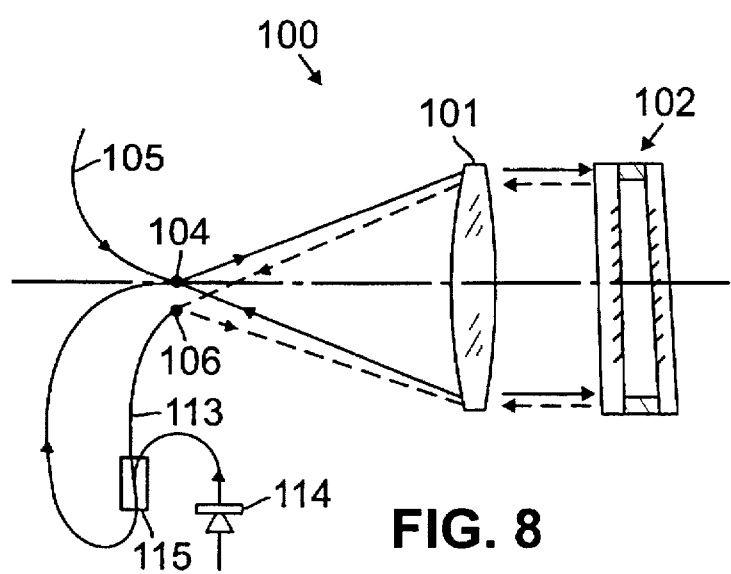
FIG. 8 is a simplified illustration of an interferometer apparatus which incorporates an optical fiber having optical gain into the signal path to increase the signal level of the optical signal.

FIG. 8 illustrates an exemplary embodiment of an interferometer 100 which includes coupling of a fiber having optical gain for increasing the signal level and, in certain circumstances, the signal-to-noise ratio in the detected output. Referring to FIG. 8, the interferometer 100 includes a lens 101 followed in the optical signal path by a etalon 102. The light directed to the interferometer 100 emanates from a spot 104 which is at one end of an optical fiber 105 and acts as the primary light source. The light reflected by the interferometer 100 is focused at a spot 106 in a manner similar to that described above in connection with FIGS. 4 and 5. An optical fiber 113 collects the focused, reflected light at the spot 106. The fiber 113 exhibits optical gain when it is optically pumped by a laser diode 114, which is coupled to the fiber 113 by means of an optical coupler 115. The end of the fiber 113, which is opposite the end where light is collected, is positioned near or at the same point where the reflected light is focussed and collected to cause routing of the reflected light through the fiber 113 back to the location where light was initially directed towards the interferometer 100.

In one preferred embodiment of the interferometer 100, optical gain may be applied to light directed at the interferometer 100 by including gain in the fiber 105 used in the initial input leg. A gain fiber may be also used in the optical signal path which extends from the point where the reflected light is focussed and collected to enable illumination of another etalon in a cascade configuration. Further, an optical gain fiber may also be used in one or more stages of a multiple-pass configuration. In still another embodiment, a single etalon may be used to measure or control the input wavelength and an optical fiber having gain may be located in the optical signal path which extends from the point where reflected light is focussed and collected to amplify the light when it is sent to another optical apparatus or to a communication channel.

A cascaded interferometer arranged according to the present invention may also be used to measure the relative velocity $v_t$ along the line of sight via the Doppler effect, as discussed above. In particular, the method is applicable for measurement of wind velocity, as well as for precision tracking of powered targets. For example, if the laser wavelength aimed at the target is one for which an optical fiber amplifier is available, an optical fiber amplifier with gain in the wavelength of light aimed at a target may be used for amplifying the light directed at a first etalon, or in coupling between a cascaded pair of interferometers. The fiber amplifier gain would compensate for low quantum efficiency in the detector array as well as for low etalon efficiency, thereby permitting that lower transmitted laser energies can be used successfully. There currently exist fibers with gain at 1064 nm, the wavelength of the Nd:YAG laser.

The use of fiber amplifiers with wedged etalons also provides for the reduction of noise associated with amplified spontaneous emission (ASE), which is the broadband emission (20 to 30 nm wide) from an optically pumped fiber. The level of ASE noise, which is always present, is a function of fiber gain, and can only be reduced by filtering. At the current state-of-the-art, the narrowest available filter has a bandwidth on the order of 1 nm. The current invention makes available a narrower effective filter bandwidth.

The wedged etalon is inherently a dispersive device, i.e., it spreads the spectral content of the radiation over an area. Since this area is sampled by a linear array of detectors, each detector will "see" only a fraction of the ASE. For example, if the FSR of the etalon is imaged onto a linear CCD array of 1024 elements, each element is exposed to less than 0.1% of the ASE, which contrasts to the 3-to-5% associated with a conventional filter.

The combination of a gain fiber coupled to a wedged etalon has utility in fiber optic communication channels. Long-distance channels employ fiber amplifiers. The requirement for filters to reduce the ASE limits the number of channels that can be placed within the gain bandwidth of the fiber amplifier, since the individual channels must be separated by at least the filter bandwidth. In the present invention, use of a fiber amplifier coupled to a wedged etalon narrows the effective filter bandwidth to values considerably below those presently available. This not only reduces the ASE, but also permits the individual channels to be closer together without crosstalk. A least one order-of-magnitude improvement is expected in the permissible channel density, relative to the density currently achieved.

The gain of a fiber amplifier varies with wavelength. For the channel spacings currently in use, such gain variations pose significant problems for system design. The closer channel spacing made available through the described embodiment of this invention would substantially reduce these gain differences and thus alleviate the design difficulties.

Alternatively, for short-haul communications, both the density and the total number of channels available would be increased, offering both a reduction in per-channel cost and an increase in channel capacity.

We claim:

1. A method of processing light radiation at an interferometer, wherein the interferometer includes a wedged-spaced etalon, the method comprising the steps of:
   collimating light supplied from a source;
   impinging the collimated light onto the etalon at an incidence direction other than normal;
   reflecting the impinging light from the etalon;
   focussing the reflected light away from the source; and
   collecting the focussed light.

2. The method of claim 1, wherein the step of collimating the reflected light further comprises passing the light through a collimating optic, and wherein the focussing step further comprises passing the reflected light through the optic.

3. The method of claim 1, wherein the collecting step further comprises collecting the focussed light in an optical fiber.

4. The method of claim 3 further comprising:

re-directing at the interferometer the light collected at the fiber.

5. The method of claim 3 further comprising:

re-directing at a second interferometer the light collected at the fiber.

6. The method of claim 5, wherein the step of re-directing light at the second interferometer further comprises re-directing light at a second wedged-spaced etalon in the second interferometer.

7. The method of claim 1, wherein the collimating step further comprises the step of collimating light supplied from each of a plurality of sources.

8. The method of claim 7 further comprising:

receiving light transmitted through the etalon at a linear array of photodetectors.

9. The method of claim 8 further comprising:

measuring the transmitted light at the array for determining the wavelength of the light radiation supplied by at least one of the plurality of the sources.

10. The method of claim 4 further comprising the steps of:

collimating the re-directed light;

impinging the collimated re-directed light onto the etalon at an incidence direction other than normal;

reflecting the impinging re-directed light from the etalon;

focussing the reflected re-directed light away from the fiber; and collecting the focussed re-directed light.

11. The method of claim 10, wherein the step of collecting the focussed re-directed light further comprises:

collecting the focussed re-directed light in a second optical fiber.

12. The method of claim 6 further comprising:

collimating the re-directed light;

impinging the collimated re-directed light onto the second etalon at an incidence direction other than normal;

reflecting the impinging re-directed light from the second etalon;

focussing the reflected re-directed light away from the fiber; and collecting the focussed re-directed light.

13. The method of claim 12 wherein the step of collecting the focussed re-directed light further comprises:

collecting the focussed re-directed light in a second optical fiber.

14. The method of claim 3 further comprising:

optically amplifying the collected light in the fiber.

15. The method of claim 13 further comprising:

optically amplifying the collected re-directed light in the second fiber.

16. An interferometer apparatus comprising:

a collimating optic;

a wedged-spaced etalon coupled to the optic, wherein the optic collimates light radiation supplied from a source for impingement upon the etalon at an incidence direction other than normal such that the light is reflected by the etalon back through the optic and the optic focusses the reflected light away from the source; and means for collecting the light reflected from the etalon and focussed by the optic at a location away from the source.

17. The apparatus of claim 16, wherein the collecting means is an optical fiber.

18. The apparatus of claim 17, wherein the optical fiber re-directs the collected light at the interferometer.

19. The apparatus of claim 18, wherein the optical fiber includes an optical amplifier means for amplifying the collected light.

20. The apparatus of claim 18 further comprising:

a second means for collecting light and re-directing the collected light at the interferometer, wherein the optic collimates the re-directed light for impingement upon the etalon at an incidence direction other than normal such that the redirected light is reflected by the etalon back through the optic and the optic focusses the reflected re-directed light away from the second collecting and re-directing means.

21. The apparatus of claim 20, wherein the second collecting and re-directing means is an optical fiber.

22. The apparatus of claim 20, wherein the second collecting and re-directing means includes an optical amplifier for amplifying the collected light.

23. An interferometer apparatus comprising:

a source of light radiation;

a collimating optic for collimating, the light radiation;

a wedged-spaced etalon coupled to the optic such that the collimated light impinges upon the etalon at an incidence direction other than normal and the etalon reflects the impinging light back through the optic for focussing by the optic at a location away from the source; and means for collecting the light focussed by the optic.

24. The method of claim 9, wherein the measuring step further comprises determining each of the wavelengths of the light radiation supplied by the plurality of the sources simultaneously.

* * * * *

UNITED STATES PATENT AND TRADEMARK OFFICE
CERTIFICATE OF CORRECTION

PATENT NO. : 5,666,195
DATED : September 9, 1997
INVENTOR(S) : Shultz et al.

It is certified that error appears in the above-identified patent and that said Letters Patent is hereby corrected as shown below:

Column 10, l. 40 should read, "...for collimating the light..."

Signed and Sealed this

Eighth Day of December, 1998

Attest:

BRUCE LEHMAN

Attesting Officer

Commissioner of Patents and Trademarks